United States Patent
Pery-Johnston

(10) Patent No.: US 6,540,500 B2
(45) Date of Patent: Apr. 1, 2003

(54) APPARATUS FOR FORMING BENDS IN THERMOPLASTIC PIPE

(76) Inventor: Ranald John Pery-Johnston, 19 Benjamin Pl., Sinnamon Park, QLD (AU), 4073

(*) Notice: Subject to any disclaimer, the term of this patent is extended or adjusted under 35 U.S.C. 154(b) by 0 days.

(21) Appl. No.: 09/805,709

(22) Filed: Mar. 13, 2001

(65) Prior Publication Data

US 2001/0045689 A1 Nov. 29, 2001

Related U.S. Application Data

(60) Provisional application No. 60/189,511, filed on Mar. 15, 2000.

(51) Int. Cl.[7] .............................................. B29C 53/08
(52) U.S. Cl. ...................... 425/193; 425/392; 425/393; 264/339
(58) Field of Search ................. 425/193, 392, 425/393; 264/310, 312, 313, 339

(56) References Cited

U.S. PATENT DOCUMENTS 3,922,134 A * 11/1975 Kupfrian ..................... 249/65
4,746,386 A * 5/1988 Sato et al. .................. 156/175
6,309,588 B1 * 10/2001 Powell et al. ............... 264/322

FOREIGN PATENT DOCUMENTS

| GB | 1482100 A | 8/1977 |
|----|-----------|--------|
| ZA | 8205769 A | 8/1982 |

* cited by examiner

Primary Examiner—Jan H. Silbaugh
Assistant Examiner—Donald Heckenberg
(74) Attorney, Agent, or Firm—DeLio & Peterson, LLC

(57) ABSTRACT

The invention provides an apparatus for forming a bend in a linear section of thermoplastic pipe. The apparatus comprises an anvil having a concave working surface which defines an arc of at least the bend angle of the bend to be formed in the pipe section. The anvil further includes a collar for retaining an end of the pipe section adjacent to the working surface. The apparatus also includes a flexible mandrel of substantially the same internal diameter as the pipe, with the mandrel being inserted into the pipe prior to the bending operation. A method is also disclosed using the apparatus to bend a section of thermoplastic pipe.

15 Claims, 5 Drawing Sheets

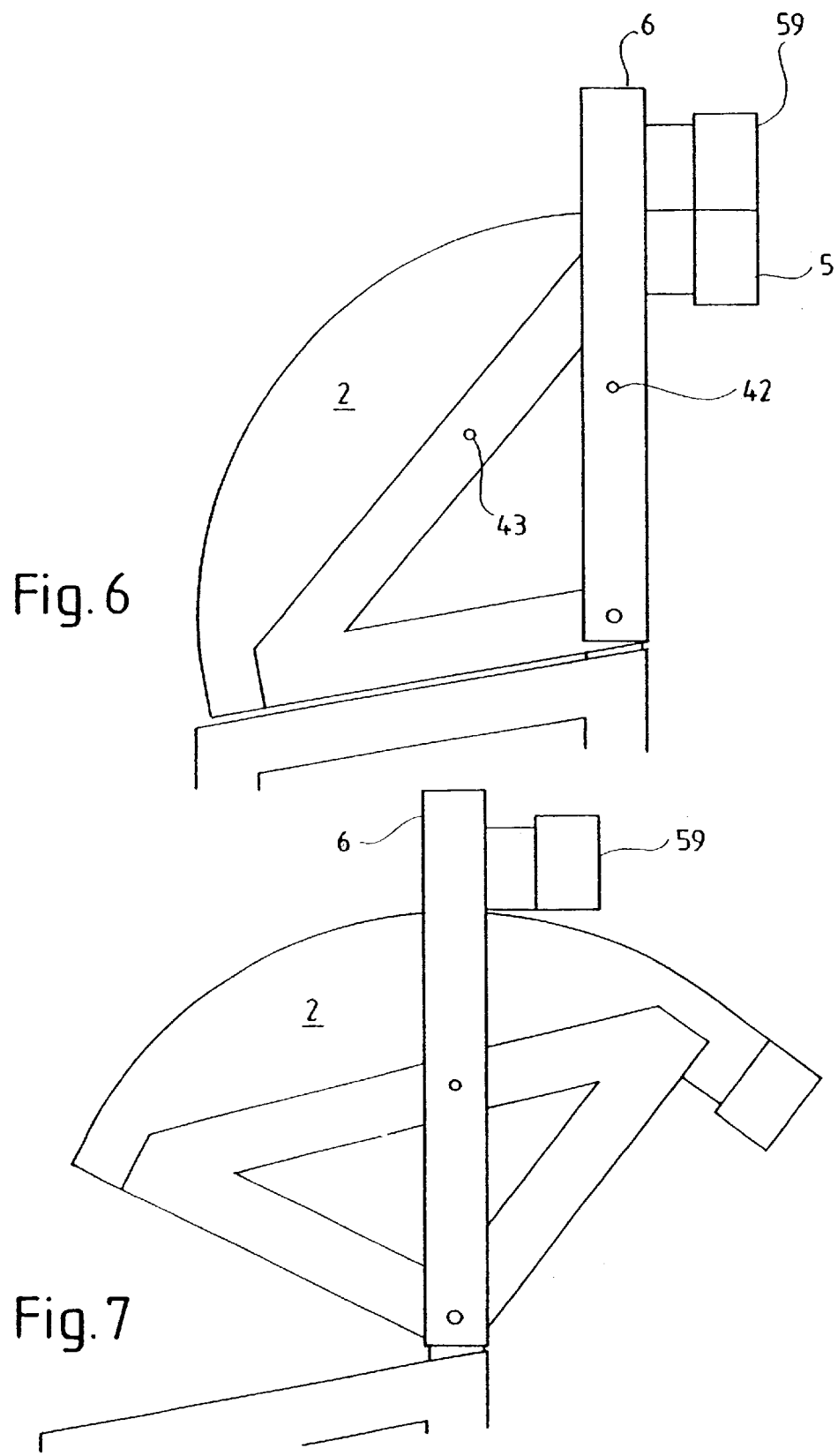

APPARATUS FOR FORMING BENDS IN THERMOPLASTIC PIPE

TECHNICAL FIELD

This invention relates to thermoplastic pipe. In particular, the invention relates to apparatus which can be used for forming bends in thermoplastic pipe. The invention also relates to a method of forming a bend in thermoplastic pipe, which method utilises the apparatus of the invention.

BACKGROUND ART

Thermoplastic piping is now widely used for water and sewage reticulation and for gas supply. Such piping can be supplied as discrete lengths but in some instances is provided as rolls allowing continuous laying of pipe over long distances.

Irrespective of the length of the sections used to make up a piping system, bends are invariably required. This is despite the fact that thermoplastic pipe, particularly of smaller wall thicknesses, has some flexibility. Bends are typically provided at angles of 30°, 45°, 60° or 90°.

To be incorporated into the piping system the bends must be connected to the adjacent pipe sections in the same fashion as the pipe sections per se must be joined. Thermoplastic pipe sections are commonly connected by electrofusion or butt welding. In some cases, a butt flange may be provided between sections but each half of the butt flange must be connected to a section using the foregoing methods.

So that a join can be formed that is commensurate with the pressure rating of the pipe, it is important that the ends of pipe sections to be joined are both circular. That is, if one section has a circular end while the other end has a slightly oval end, an inferior joint will be produced.

According to present practice, bends are formed in sections of thermoplastic pipe by supporting a section of softened pipe at its ends and applying pressure at the centre of the section to form the desired bend.

A disadvantage of the known method for forming bends in thermoplastic pipe is that the pipe is stretched preferentially in the middle of the arc during the bending process. This is particularly the case with the outside wall of the bend. The stretching weakens the pipe wall and leads to derating of the pressure rating of the bend.

SUMMARY OF THE INVENTION

The object of the present invention is to provide a method of forming a bend in a section of thermoplastic pipe, which method overcomes the disadvantages of the existing method for forming such bends.

In one aspect, the invention provides apparatus for forming a bend in a linear section of thermoplastic pipe, the apparatus comprising:
- an anvil having a concave working surface which defines an arc of at least the bend angle of the bend to be formed in said pipe section and which is transversely arced at a radius essentially the same as the radius of said pipe, said anvil further including a collar for retaining an end of said pipe section adjacent said working surface; and
- a flexible mandrel of substantially the same internal diameter as said pipe and of at least the same length as said pipe section.

In a second aspect, the invention provides a method of forming a bend in a linear section of thermoplastic pipe, the method comprising the steps of:

(i) heating said pipe section to the softening temperature thereof;

(ii) driving a flexible mandrel of substantially the same internal diameter as said pipe and of at least the same length as said pipe section into said pipe section;

(iii) loading said pipe section and mandrel onto an anvil having a concave working surface which defines an arc of at least the bend angle of the bend to be formed in said pipe section and which is transversely arced at a radius essentially the same as the radius of said pipe, said anvil further including a collar for retaining an end of said pipe section adjacent said working surface;

(iv) drawing the end of said pipe section opposite said retained end towards said working surface to bring the bulk of the pipe section into contact with said working surface;

(v) allowing said pipe section to cool to below said softening temperature while held in contact with said working surface; and (vi) withdrawing said mandrel from said pipe section.

As used herein, the terms "comprising" and variants thereof such as "comprise" and "comprised" denote that the described apparatus or method includes the stated integer or integers but do not necessarily exclude the inclusion of other integers.

The term "thermoplastic" as used herein applies particularly to polyolefins such as polyethylene and polypropylene.

It will be appreciated from the two aspects of the invention defined above that the anvil provides a former for the bend while the mandrel maintains the circularity of the pipe section, particularly at the ends of the section.

The anvil working surface is in effect a curved channel which receives the softened pipe section. As noted above, the radius of the transverse channel arc is essentially the same as the radius of the pipe. This aids maintenance of the circularity of the pipe during the bending process.

The angle of the arc defined by the anvil working surface can be equivalent to the desired bend angle of the pipe section. Preferably, however, the arc has an angle of about 100°. To provide for bend angles of less than 90° using the preferred anvil, the retaining collar is adapted to be repositionable. Thus, if a bend angle of only 30° is required, the retaining collar is repositioned to give an arc of about 35°. The retaining collar is typically repositionable throughout the range of 30° to 90°.

To facilitate use of the anvil of apparatus according to the first aspect, the anvil is advantageously mounted to a support frame, which frame can be secured to a supporting surface such as a workshop floor or the like.

For use with pipe of greater than 125 mm diameter, apparatus according to the first aspect advantageously includes a stepped track for supporting the softened pipe section and the mandrel. A lower portion of the track is for supporting the pipe while a higher portion supports the mandrel. The difference between the lower and higher portions of the track is roughly equivalent to the wall thickness of the pipe. This allows the mandrel to be slid from its supporting section of track directly into the bore of the pipe section. The track advantageously comprises a pair of spaced apart rail members with a support frame.

In a particularly preferred embodiment of the invention, a trolley is provided on the upper portion of the track on which trolley the mandrel is carried. The trolley is advantageously height adjustable so that different wall thicknesses of the pipe section can be compensated for when the mandrel and pipe section axes need to be aligned.

With apparatus including a stepped track, the anvil is pivotally mounted to the support frame and positioned adjacent the lower portion end of the track with the working surface of the anvil aligned with the track. For loading the softened pipe section, the anvil is pivoted towards the track to present the retaining collar to the track. Once the collar has received the pipe end, the anvil can be pivoted away from the track so that the pipe section can be brought into contact with the working surface.

Turning to the mandrel of apparatus according to the first aspect of the invention, this typically comprises a coil spring within a sleeve of an elastomeric material such as rubber. Sizing rings can be provided at ends of the mandrel. The sleeve can be stepped to receive sizing rings.

Apparatus according to the invention can be used for forming bends in thermoplastic pipe sections of any diameter including diameters of 90 mm up to 1,000 mm. It will be appreciated, however, that apparatus components must be configured appropriately for the pipe section diameter.

In the method according to the second aspect, the section of thermoplastic pipe can be softened using any of the methods known to those of skill in the art. Preferably however, the pipe section is heated in a thermostatically-controlled bath of a non-volatile liquid such as glycerine. Rollers can be included in the bath to ensure even heating of the pipe.

To aid insertion of the mandrel into the softened pipe section in step (ii) of the method, the mandrel is advantageously lubricated. A suitable lubricant is liquid soap.

Steps (ii) and (iii) of the method can be mechanically aided. For example, a winch can be used to drive the mandrel into the pipe section. A winch can also be used for steps (iii) and (iv). Pivoting of the anvil is typically aided by a hydraulic ram.

Withdrawal of the mandrel in step (vi) of the method according to the second aspect can be mechanically aided such as by using a winch.

Having broadly described the invention, apparatus will now be exemplified with reference to the accompanying drawings briefly described hereafter.

BRIEF DESCRIPTION OF THE DRAWINGS

FIG. 6 is an elevational view of the anvil portion of the apparatus shown in FIG. 1.

FIG. 7 is the same elevational view shown in FIG. 6 but with the anvil repositioned relative to the retaining collar.

BEST MODE OF CARRYING OUT THE INVENTION

Figure 1:
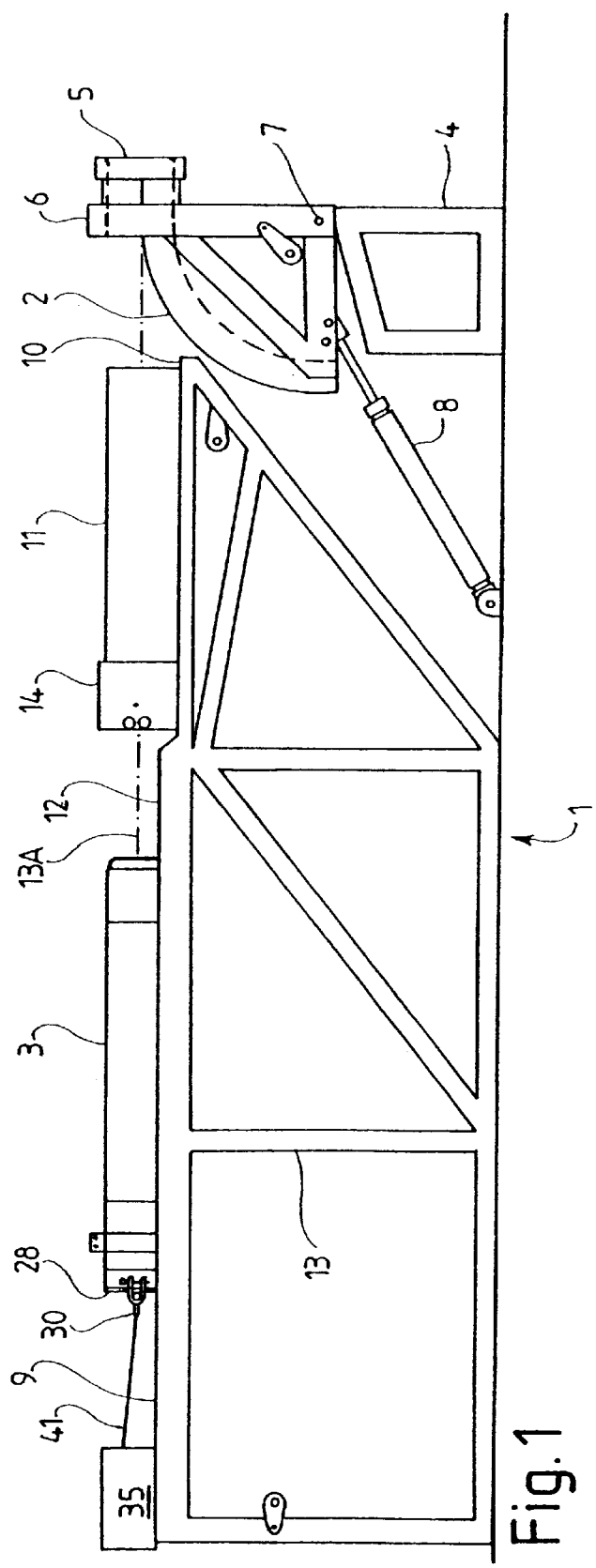
FIG. 1 is an elevational view of the apparatus for forming a bend in a section of thermoplastic pipe.

Referring now to FIG. 1, there is shown apparatus 1 for forming a bend of up to 90° in a 250 mm diameter thermoplastic pipe of 10 mm wall thickness (230 mm ID). The apparatus includes an anvil 2 and mandrel 3. Anvil 2 is pivotally mounted to a support frame 4 and includes circular collar 5 made up of two halves, one of which is fixed to an arm 6 which can pivot about the same axis 7 as anvil 2. A hydraulic ram 8 is provided for pivoting of anvil 2.

The apparatus also includes a track 9 having a lower step 10 for supporting a pipe section such as shown at 11 and a higher step 12 for supporting mandrel 3. Track 9 is supported by a framework 13 and consists of a pair of rails 180 mm apart the upper edges of which slope downwardly towards the centre of the track. The rails in effect form a cradle for the mandrel and pipe section.

The stepped nature of track 9 results in alignment of the axes of mandrel 3 and pipe section 11 which axes are aligned with the axis of collar 5. This common axis is indicated by dashed line 13a. The common axis facilitates driving the mandrel into pipe section 11 and the ultimate homing of the end of pipe section 11 in collar 5.

A collar 14 is also provided for placement about the end of pipe section 11 opposite the end which will be received by collar 5. Collar 14 includes an inwardly directed lip which abuts the end of pipe section 11 with the collar in situ. Collar 14 thus in effect acts as a cap for the end of the pipe section. Collar 14 acts as a stop for the mandrel on anvil loading and has other functions as will be detailed below.

Figure 2:
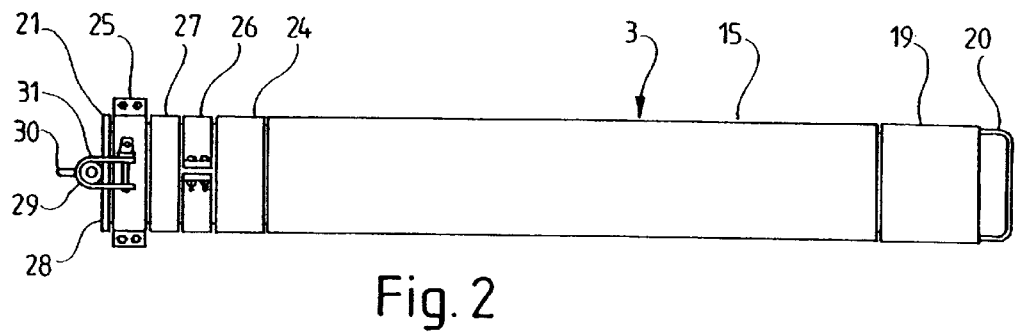
FIG. 2 is an elevational view of a mandrel.
Figure 3:
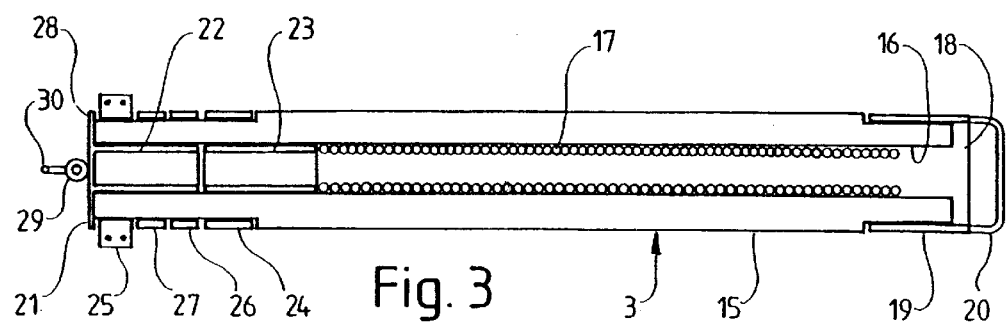
FIG. 3 is a cross-sectional view of the mandrel as shown in FIG. 2.

Turning to FIGS. 2 and 3 there is shown mandrel 3 having an elastomeric sleeve 15 which has a bore 16 in which there is a metal coil 17. Each end of sleeve 15 is stepped as can be appreciated from FIG. 3. The leading end 18 of the mandrel—this is, the end which first enters the bore of pipe section 11—has a removable sizing ring 19 thereabout which includes a handle 20. The trailing end 21 of the mandrel includes cylindrical plugs 22 and 23 within bore 16, sizing ring 24 and clamps 25 to 27. Sleeve 22 has an end plate 28 which abuts the end of sleeve 15. End plate 28 has a diametric pin 29 thereacross which extends beyond the edge of the plate. A central eyelet 30 is also present on the end plate. The ends of pin 29 have keepers for retaining shackles, one of which is indicated at 31, which are used in the winching process to be described below.

Figure 4:
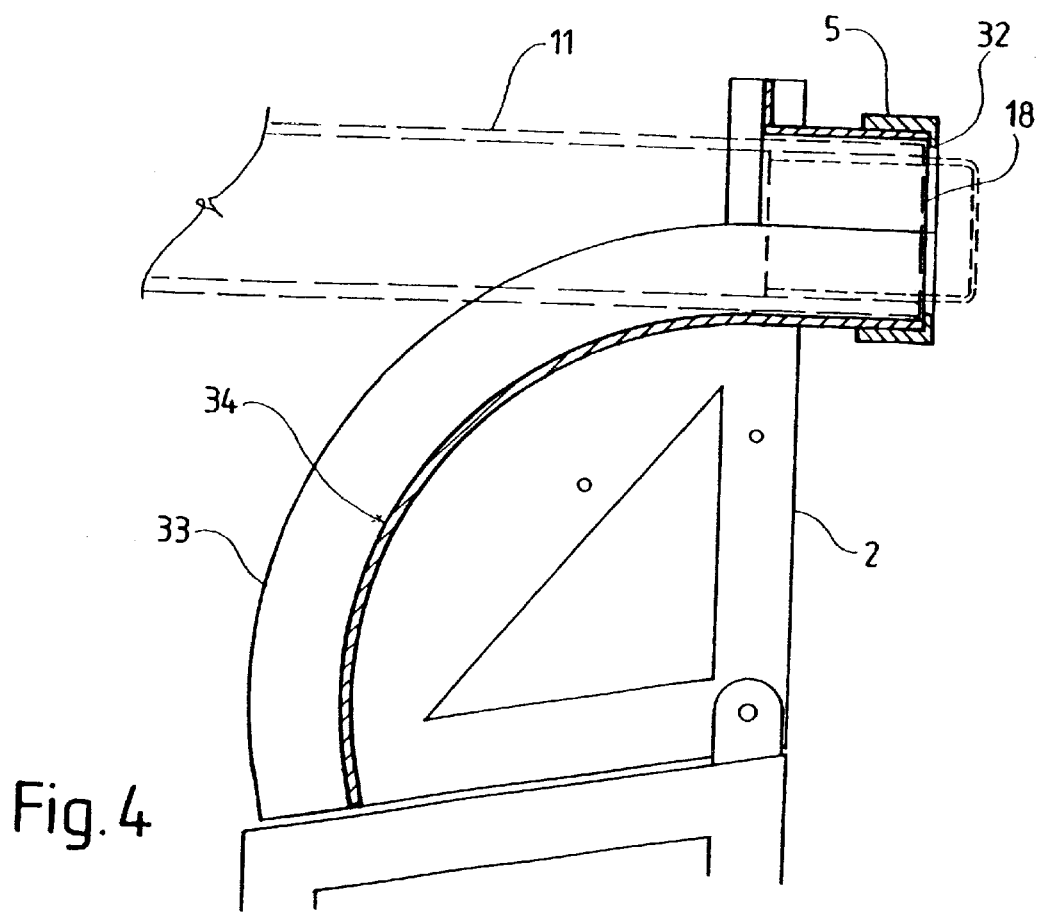
FIG. 4 is a cross-sectional view of the anvil portion of the apparatus shown in FIG. 1 with a pipe section and mandrel in situ.

The anvil portion 2 of the apparatus is shown in FIG. 4 with pipe section 11 and the mandrel in situ. The leading end of pipe section 11 (shown in phantom) can be seen to lie within collar 5 of anvil 2 where it abuts an internal lip 32 on collar 5. Sizing ring 19 (in phantom) can also be seen. The end of the sizing ring can extend through the lipped end of collar 5 as can be appreciated from the drawing.

The cupped nature of the working surface 33 of anvil 2 can be appreciated from FIG. 4 by virtue of the base 34 of the arced channel of the working surface being in cross-section. FIG. 4 also shows that the collar end of the working surface is in fact linear. This provides a linear portion at the end of the formed bend, referred to as a "land". It will be further appreciated that pipe end 18 contacts working surface 33 in the region of collar 5. Thus, the term "adjacent" as used in the broad description of the invention embraces "in contact" with the working surface.

Track 9 of apparatus 1 has a length of 3,000 mm and stands a maximum of 1,280 mm above floor level. Anvil 2 has a centre line radius of 750 mm which is three times the diameter of the pipe to be bent. Mandrel 3 has a nominal diameter of 215 mm while collar 5 and collar 14 have nominal inside diameters of 260 mm. Transverse arc of working surface 33 of anvil 2 (see FIG. 4) has a radius of 127 mm.

The process of forming a bend in pipe section 11 will now be described with reference to FIGS. 1, 4 and 5. Pipe section 11, 400 to 1,600 kPa rated polyethylene, is first softened by incubating for 10 to 60 minutes in a glycerine bath of 126°

C. The pipe section is then transferred to lower portion 10 of track 9 of apparatus 1 with collar 14 thereabout (see FIG. 1). A winch line is connected from winch 35 via pulleys and guides to both ends of pin 29 of mandrel 3. The winch is then used to drive mandrel 3 into pipe section 11. Initially, the leading end of pipe section 11 enters collar 5 where it abuts lip 32 of the collar (see FIG. 4). Continued winching homes the mandrel in pipe section 11. Further travel of the mandrel is prevented by tabs on clamp 26 (see FIG. 2) abutting collar 14.

Figure 5:
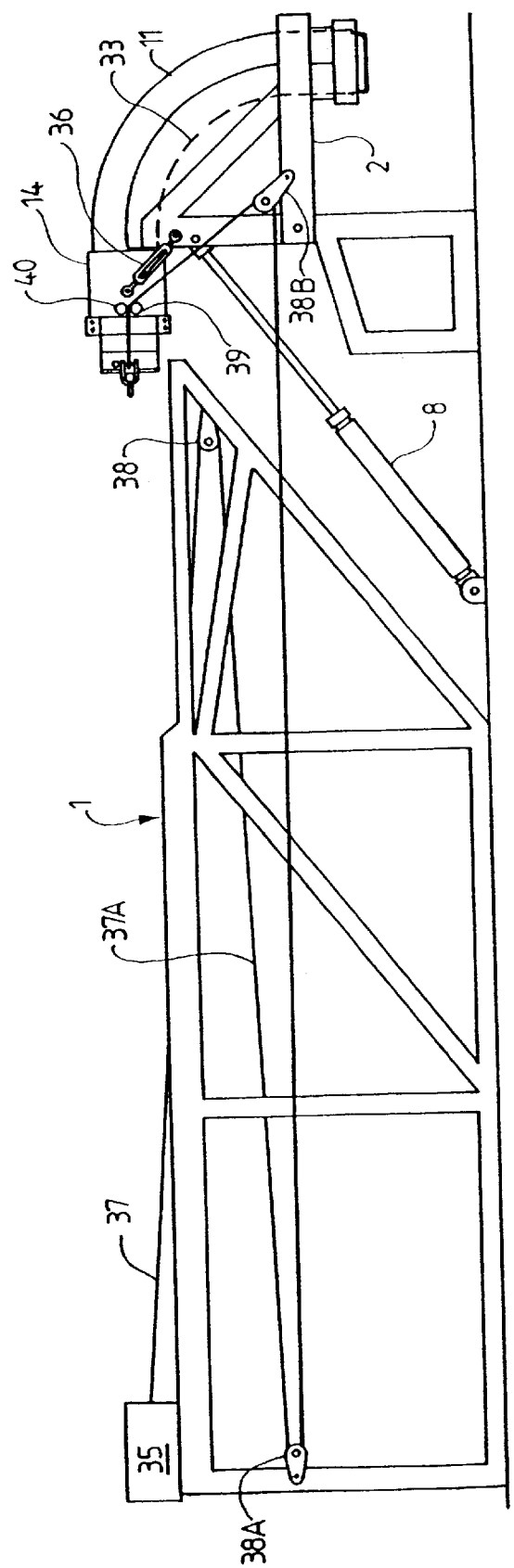
FIG. 5 is the same elevational view shown in FIG. 1 but with the pipe section in position on the apparatus anvil.

Loading of pipe section 11, mandrel 3 on anvil 2 is completed by pivoting of the anvil 2 to the position shown in FIG. 5. Pivoting is effected by hydraulic ram 8. The winch is used to draw the pipe section into contact with the working surface 33 of anvil 2 in which position it is retained by turnbuckles between screw-in pins on collar 14 and female threads on anvil 2. One such turnbuckle is indicated at 36. Winch 35 is connected to both ends of pin 29 by a line 37 which extends to pulley 38 which lies on a central plane of frame 13. The line splits into two beyond pulley 38 as generally indicated at 37a. The split lines extend to pulleys on each side of frame 13, one of which is indicated at 38a, then to pulleys on each side of anvil 2, one of which is indicated at 38b, and finally via a pair of cable guide rollers on each side of collar 14 to pin 29. Items 39 and 40 are the cable guide rollers comprising the pair of rollers on the side of the bending frame facing the viewer.

Once loaded, pipe section 11 is allowed to cool to 50 to 70° C. (surface temperature). This can be aided by application of water of ambient temperature or less. The mandrel is then withdrawn using the winch. (A winch line 41 connected to eyelet 30 of end plate 28 is shown in FIG. 1 but it will be appreciated that during withdrawal of mandrel 3, anvil 2 and pipe section 11 are in the positions shown in FIG. 5). The pipe section is then allowed to fully harden on the anvil—20 to 60 minutes. Sizing ring 19 which is generally retained within the pipe section on withdrawal of the mandrel, can be removed via the winch after the bent pipe section is reversed on the anvil Pipe formed by the above process has end dimension and ovality equal to pipe standard ASNZ 4130-1997. Another advantage of the process according to the present invention is that the pipe section is in effect compressed during the bending (this is by virtue of the section being retained between collars 5 and 14). Wall thickness of the section on the outside arc of the bend has minimal reduction from original and as a consequence bends do not have to be derated as is the case with conventional bending processes.

FIGS. 6 and 7 show how anvil 2 of FIG. 1 can be adapted for forming bends of less than 90°. As noted above, collar 5 comprises two halves—items 5a and 5b of FIGS. 6 and 7—one of which (5a) is attached to pivotal arm 6. When the halves are aligned, such as for formation of a 90° bend, a ring 59 holds the halves together. Ring 59 is secured to the halves with screws. It can be appreciated from FIG. 7 that the collar halves include a register stop for ring 59 in that the ends of each half are stepped. When a bend of less than 90° is desired, pivotal arm 6 is moved to the required position for the desired bend angle. For example, in FIG. 7, arm 6 is positioned so that the available portion of working surface 33 of anvil 2 will allow a bend of 60° to be formed in the pipe. Arm 6 can be locked at required positions by a bolt through hole 42 which is received by a threaded hole 43 in anvil 2 (see FIG. 6).

It will be appreciated from FIG. 7 that arm 6 and collar half 5a are perpendicularly positioned for pipe section/mandrel homing. Thus, anvil 2 is in a different position to that shown in FIG. 1 which is for formation of a 90° bend.

FIG. 7 shows that when anvil 2 is used for less than 90° bends, the pipe end when homed in collar half 5a is slightly away from working surface 33. This allows retention of a short linear section, or land, at the end of the bend. Hence, the term "adjacent" as used above also embraces a situation where the pipe end is not in contact with the anvil working surface.

It will be further appreciated that many changes can be made to the apparatus and method as exemplified above without departing from the broad ambit and scope of the invention.

Thus, having described the invention, what is claimed is:

1. Apparatus for forming a bend in a linear section of thermoplastic pipe, the apparatus comprising:
   an anvil having a concave working surface which defines an arc of at least the bend angle of the bend to be formed in said pipe section and which is transversely arced at a radius essentially the same as the radius of said pipe, said anvil further including a collar for retaining an end of said pipe section adjacent said working surface; and
   a support frame for said anvil;
   a flexible mandrel of substantially the same internal diameter as said pipe and of at least the same length as said pipe section; and
   a stepped track for supporting said mandrel and pipe section, a higher portion of which supports said mandrel and the lower portion of which supports said pipe section, the difference between said higher and lower portions being about the same as the wall thickness of said pipe section, and wherein axes of said mandrel and pipe section are aligned when in position on said tack; wherein
   said anvil is pivotally mounted to said support frame with said working surface of said anvil adjacent said lower portion of said track and aligned therewith.

2. The apparatus according to claim 1, wherein said track comprises a pair of spaced apart rails with a support frame.

3. The apparatus according to claim 1, wherein a trolley for carrying said mandrel is provided on said track higher portion.

4. The apparatus according to claim 1, wherein said trolley is height adjustable.

5. The apparatus according to claim 1, wherein said mandrel comprises a coil spring within a sleeve of an elastomeric material.

6. The apparatus according to claim 5, wherein said elastomeric material is rubber.

7. The apparatus according to claim 5, wherein said mandrel sleeve is stepped at each end for receiving sizing rings.

8. The apparatus according to claim 1, wherein said arc defined by said concave working surface is about 100°.

9. The apparatus according to claim 1, wherein said retaining collar is repositionable to allow formation of a bend of a desired angle.

10. The apparatus according to claim 9, wherein said desired angle is 30° to 90°.

11. The apparatus according to claim 1 which further includes a winch for drawing said mandrel into said pipe section and drawing an end of said pipe section with said mandrel therein into register with said anvil collar, and for withdrawing said mandrel from said pipe section after bending thereof.

12. The apparatus according to claim 1 which further includes an hydraulic ram for pivoting of said anvil.

13. The apparatus according to claim 11, wherein said mandrel has an end plate fitted to the distal end thereof by which said mandrel is connected to said winch.

14. The apparatus according to claim 1, wherein a second collar is provided for fitting about the end of a said pipe section opposite the end to be received by said anvil collar.

15. The apparatus according to claim 14, wherein an adjustable linkage is provided between said second collar and said anvil for retaining said pipe section in contact with said anvil working surface after the bending of said pipe section.

* * * * *